United States Patent
Nakamura et al.

(10) Patent No.: US 7,833,128 B2
(45) Date of Patent: Nov. 16, 2010

(54) CONTROL DEVICE FOR AUTOMATIC TRANSMISSION

(75) Inventors: Kazuaki Nakamura, Toyota (JP); Hiromichi Kimura, Okazaki (JP); Koji Oshima, Nagoya (JP); Tomohiro Asami, Nissin (JP); Takahiro Kondo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 580 days.

(21) Appl. No.: 11/817,418

(22) PCT Filed: Mar. 1, 2006

(86) PCT No.: PCT/JP2006/304426
§ 371 (c)(1),
(2), (4) Date: Aug. 30, 2007

(87) PCT Pub. No.: WO2006/093324
PCT Pub. Date: Sep. 8, 2006

(65) Prior Publication Data
US 2008/0248925 A1 Oct. 9, 2008

(30) Foreign Application Priority Data
Mar. 2, 2005 (JP) ............................. 2005-057443

(51) Int. Cl.
*F60H 60/00* (2006.01)
(52) U.S. Cl. ................. 477/154; 477/127; 477/156
(58) Field of Classification Search ................. 477/115, 477/127, 130, 148, 149, 154, 156
See application file for complete search history.

(56) References Cited

U.S. PATENT DOCUMENTS

| | | | |
|---|---|---|---|
| 4,019,614 A * | 4/1977 | Prenzel et al. | 192/103 F |
| 5,439,428 A * | 8/1995 | Slicker | 477/175 |
| 6,512,971 B2 * | 1/2003 | Koumura et al. | 701/51 |
| 6,656,090 B2 * | 12/2003 | Matsumura et al. | 477/171 |
| 6,676,563 B2 * | 1/2004 | Katou | 477/78 |
| 2003/0027685 A1 | 2/2003 | Watanabe et al. | |

FOREIGN PATENT DOCUMENTS

| | | |
|---|---|---|
| JP | 61 189354 | 8/1986 |
| JP | 4 277370 | 10/1992 |
| JP | 5 196124 | 8/1993 |
| JP | 7-71582 | 3/1995 |
| JP | 8 303567 | 11/1996 |
| JP | 11 37272 | 2/1999 |
| JP | 2000 205395 | 7/2000 |
| JP | 2003 42281 | 2/2003 |
| JP | 2003 322249 | 11/2003 |
| JP | 2004 347066 | 12/2004 |
| KR | 2003-0084733 | 11/2003 |

* cited by examiner

*Primary Examiner*—Ha D. Ho
(74) *Attorney, Agent, or Firm*—Oblon, Spivak, McClelland, Maier & Neustadt, L.L.P.

(57) ABSTRACT

An ECU executes a program including detecting an engine speed; detecting a turbine speed; calculating a slip revolution speed of a torque converter as; calculating a hydraulic pressure control value based on the slip revolution speed and a map; and outputting a hydraulic pressure control signal to a linear solenoid. The map is set such that the hydraulic pressure control value is smaller as the slip revolution speed increases in positive values.

10 Claims, 9 Drawing Sheets

F I G. 1
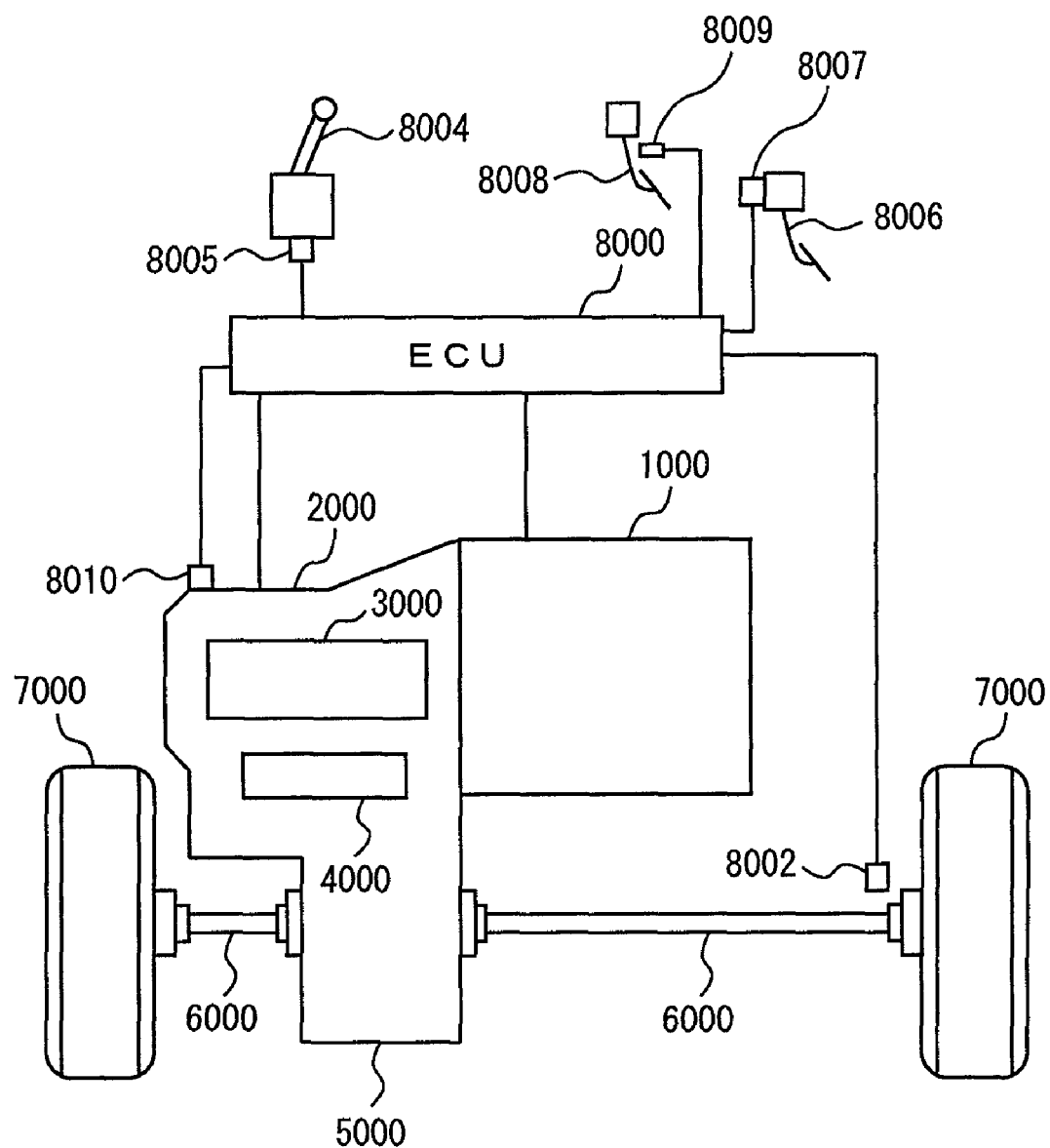

FIG. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGE

× DISENGAGE

◎ ACTUATED DURING ENGINE BRAKING

△ ACTUATED ONLY DURING DRIVING

F I G. 8

| N(SLP) | GEAR SHIFT NOUT(rpm) |
|---|---|
| $-100 > N(SLP)$ | 1700 |
| $-100 \leq N(SLP) \leq 50$ | 1600 |
| $50 < N(SLP) < 150$ | 1500 |
| $150 < N(SLP)$ | 1400 |

CONTROL DEVICE FOR AUTOMATIC TRANSMISSION

TECHNICAL FIELD

The present invention relates to a control device of an automatic transmission, and more particularly to a control device suppressing occurrence of gear shift shock in coastdown gear shift and achieving excellent gear shift characteristics.

BACKGROUND ART

An automatic transmission that incorporates an electromagnetic valve and adjusts variables relating to a gear shift operation, such as a gear, a hydraulic pressure level, a time constant or timing in the gear shift operation, and the like, by means of an ECU (Electronic Control Unit) by receiving an electrical signal from the outside has been put into use. Such an ECU allows reliable and prompt transition of an operation state of the automatic transmission to various states. In addition, as the ECU incorporates a CPU (Central Processing Unit), control using program can be carried out. Accordingly, if an operation state of the automatic transmission is finely set by modifying a program or various constants, optimal performance of the automatic transmission can be obtained in line with a running state of a vehicle or a state of load onto an engine. Here, the running state of the vehicle refers to a vehicle speed, a steering operation, frequency and a level of acceleration and deceleration, a road surface state, and the like, while the state of load onto the engine refers to an engine speed, a throttle position, an accelerator pedal pressing degree, torque of input and output shafts of an engine or an automatic transmission, and the like.

A technique to finely tune a hydraulic pressure level applied to a frictional engagement element (a clutch or a brake) contained in the automatic transmission in accordance with the running state of the vehicle or the state of load onto the engine has been known. With such a technique, suppression of gear shift shock and reduction in wear of a fastening element can both be achieved, and rapid and smooth gear shift can be attained.

Japanese Patent Laying-Open No. 08-303567 discloses a control device of an automatic transmission capable of appropriately and finely setting a hydraulic pressure level or the like with smaller number of data pieces to be handled. The control device of the automatic transmission taking in, from hour to hour, operational information reflecting engine load and determining a control constant for the automatic transmission based on at least one of the operational information, a vehicle speed, and an engine speed, includes: storage means for storing two or more types of maps of control constants determined in correspondence with a drive region where motive power is transmitted in a direction in which the engine drives the automatic transmission and a coast region where the engine is in such an idle state that it cannot drive the automatic transmission; identification means for identifying whether a drive state of the engine is either in the drive region or in the coast region by detecting the operational information and the engine speed; and setting means for finding a control constant by selecting one of the two or more types of maps stored in the storage means in accordance with a result of identification by the identification means.

According to the control device of the automatic transmission, the drive region and the coast region are distinguished from each other based on combination of the operational information (a throttle position and an accelerator pedal pressing degree) and the engine speed. Accordingly, for example, two types of maps of hydraulic pressure setting values determined based on the throttle position and the vehicle speed are only necessary as in such an example as a hydraulic pressure setting value being associated with ON-OFF of an idle switch, and in addition, the coast region can still be identified in a throttle position region where the idle switch is switched OFF.

A state of the vehicle, however, is different, depending on an engagement state under control with flexibility, of a lockup clutch of a torque converter with lockup clutch of the automatic transmission, a gradient of a road surface, a state of a braking operation, a fast idle control state, and the like. This publication does not interpret such a difference in the state of the vehicle as a factor of fluctuation in gear shift characteristics. Namely, as the publication is merely directed to identification of two regions, i.e., the drive region and the coast region, variation in gear shift shock exists.

DISCLOSURE OF THE INVENTION

The present invention was made to solve the above-described problems, and an object of the present invention is to provide a control device of an automatic transmission capable of suppressing occurrence of gear shift shock in coastdown gear shift and achieving excellent gear shift characteristics.

A control device of an automatic transmission according to the present invention controls an automatic transmission in which motive power of a power source is transmitted via a fluid coupling and a plurality of gears are implemented based on combination of engagement and disengagement of a plurality of frictional engagement elements. The control device includes: a detection unit detecting a difference between a revolution speed of the power source and an input shaft revolution speed of the automatic transmission; and a control unit modifying a manner of control of the frictional engagement element in correspondence with the difference in the revolution speed detected by the detection unit.

According to the present invention, a manner of control in implementing a gear by engaging and disengaging frictional engagement elements of the automatic transmission is modified, based on a difference in the revolution speed (N(SLP) NE-NT) between the revolution speed of the power source (such as engine speed NE) and the input shaft revolution speed of the automatic transmission (which is equal to turbine speed NT representing an output shaft revolution speed of a torque converter implemented as a fluid coupling). For example, when a driver performs a sudden braking operation in coastdown, N(SLP) attains to a positive value (namely, NE>NT and the vehicle is in a driving state). Here, in order to mitigate shock, the manner of control is modified to lower an engagement hydraulic pressure. Meanwhile, with N(SLP) attaining to a positive value and in clutch-to-clutch gear shift, the manner of control is modified such that a delay time from disengagement of the frictional engagement element on a disengagement side until engagement of the frictional engagement element on an engagement side is greater. As the engine speed has lowered to a synchronous revolution speed after gear shift by the time the engagement on the engagement side is started, occurrence of shock at the time of engagement of the frictional engagement element can be suppressed. On the other hand, when the driver performs a gradual braking operation in coastdown, N(SLP) attains to a negative value (namely, NE<NT and the vehicle is in a driven state). With N(SLP) attaining a negative value and in clutch-to-clutch gear shift, the manner of control is modified such that a delay time from disengagement of the frictional engagement element on the disengagement side until engagement of the frictional engagement element on the engagement side is smaller (the delay time may be made as small as allowing overlapping). Engagement of the frictional engagement element on the engagement side is started by the time the frictional engagement element on the disengagement side is disengaged, so that torque loss due to absence of engagement of any frictional engagement element can be prevented and resultant occurrence of shock can be suppressed. Consequently, a control device of an automatic transmission capable of suppressing occurrence of gear shift shock in coastdown gear shift and achieving excellent gear shift characteristics can be provided.

Preferably, in the control device of an automatic transmission, the frictional engagement element is of a hydraulic type, and the control unit modifies the manner of control by changing at least one of a hydraulic pressure control value and engagement start timing of the frictional engagement device.

According to the present invention, gear shift shock can be suppressed by lowering the engagement hydraulic pressure in accordance with the difference in the revolution speed (N(SLP)=NE−NT) between engine speed NE and turbine speed NT, or gear shift shock can be suppressed by making greater or smaller a delay time from disengagement of the frictional engagement element on the disengagement side until engagement of the frictional engagement element on the engagement side in clutch-to-clutch gear shift.

Further preferably, the control device of an automatic transmission further includes: an output shaft revolution speed detection unit detecting an output shaft revolution speed of the automatic transmission; a storage unit storing information for determination of gear shift, using at least the output shaft revolution speed as a parameter; and a determination unit making determination such that the gear is shifted when the output shaft revolution speed passes a revolution speed predetermined in the information for determination. The control unit modifies the manner of control by changing the predetermined revolution speed.

According to the present invention, determination as to gear shift is made based on information for determination stored in the storage unit (such as a map represented using an output shaft revolution speed and a throttle position). When the driver performs a sudden braking operation in coastdown, N(SLP) attains to a positive value (namely, NE>NT and the vehicle is in a driving state). In such a case and in clutch-to-clutch gear shift, the manner of control is modified to delay timing to start engagement of the frictional engagement element on the engagement side, by lowering the output shaft revolution speed in the gear shift map. As the engine speed has lowered to the synchronous revolution speed after gear shift by the time the engagement of the frictional engagement element on the engagement side is started, occurrence of shock at the time of engagement of the frictional engagement element can be suppressed.

BRIEF DESCRIPTION OF THE DRAWINGS

FIG. 1 is a control block diagram showing a vehicle incorporating a control device according to a first embodiment of the present invention.

FIG. 3 is an operation table showing correspondence between each gear, and each brake and each clutch.

FIG. 8 shows a map stored in a memory within an ECU serving as a control device according to a third embodiment of the present invention.

BEST MODES FOR CARRYING OUT THE INVENTION

Figure 2:
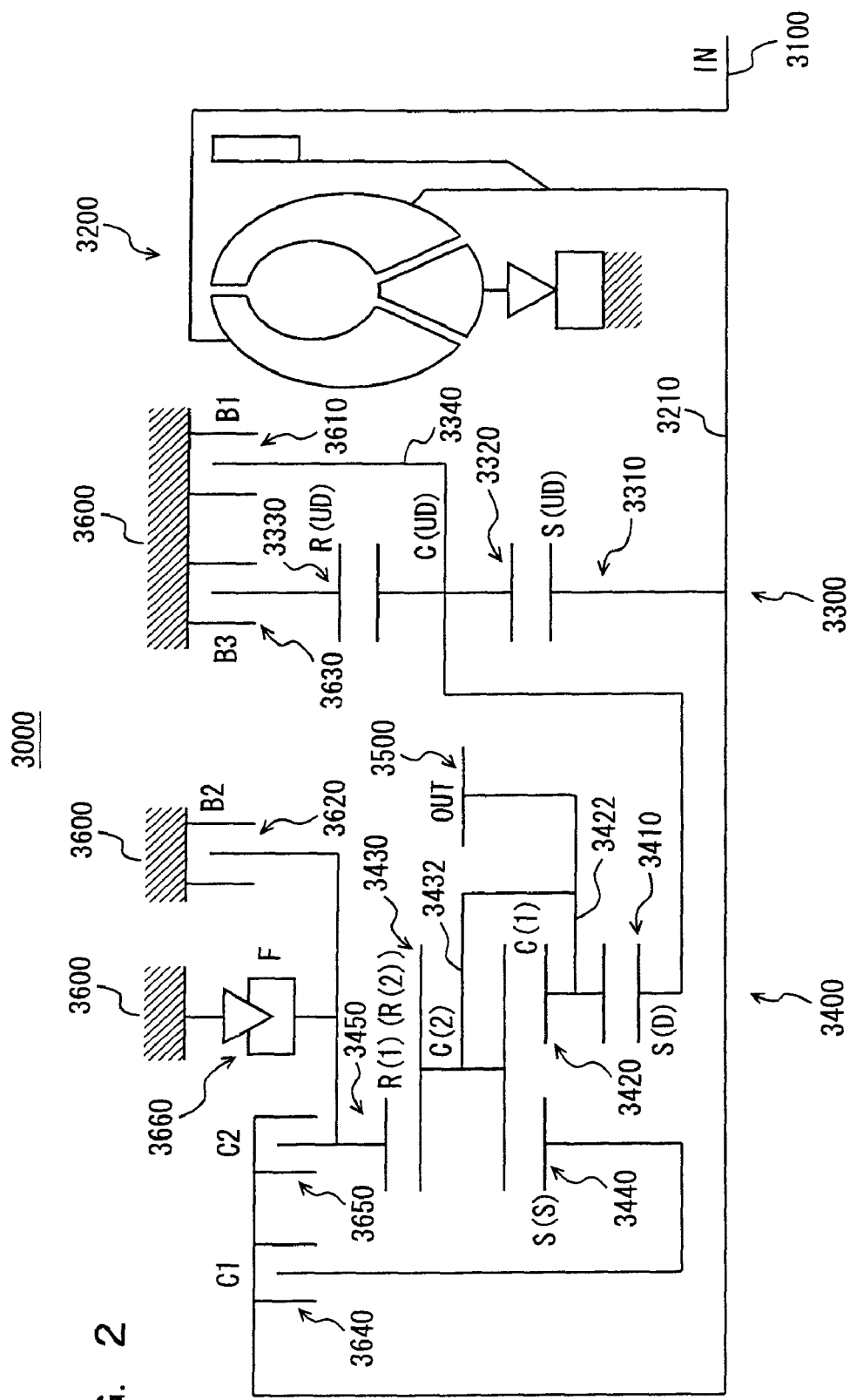
FIG. 2 is a skeleton diagram showing a planetary gear unit.

An embodiment of the present invention will be described hereinafter with reference to the drawings. In the description below, the same elements have the same reference characters allotted. Their label and function are also identical. Therefore, detailed description thereof will not be repeated.

First Embodiment

A vehicle mounted with a control device of an automatic transmission according to an embodiment of the present invention will be described with reference to FIG. 1. The vehicle is an FF (Front engine Front drive) vehicle. It is noted that a vehicle mounted with the control device of the automatic transmission according to the present embodiment may be a vehicle of a type other than FF.

The vehicle includes an engine 1000, a transmission 2000, a planetary gear unit 3000 constituting a part of transmission 2000, an oil hydraulic circuit 4000 constituting a part of transmission 2000, a differential gear 5000, a driveshaft 6000, a front wheel 7000, and an ECU (Electronic Control Unit) 8000.

Engine 1000 is an internal combustion engine that burns a gas mixture of fuel injected from an injector (not shown) and air, in a combustion chamber of a cylinder. A piston in the cylinder is pushed down by the combustion, whereby a crankshaft is rotated. It is noted that an external combustion engine may be employed instead of the internal combustion engine. Meanwhile, a rotating electric machine may be employed instead of engine 1000.

Transmission 2000 converts the revolution speed of the crankshaft to a desired revolution speed for speed change by implementing a desired gear. Transmission 2000 has an output gear that meshes with differential gear 5000. Planetary gear unit 3000 will be described in detail later.

To differential gear 5000, driveshaft 6000 is coupled by spline-fitting for example. Motive power is transmitted to the left and right front wheels 7000 via driveshaft 6000.

To ECU 8000, a vehicle speed sensor 8002, a position switch 8005 for a shift lever 8004, an accelerator position sensor 8007 for an accelerator pedal 8006, a stop lamp switch 8009 provided in a brake pedal 8008, and an oil temperature sensor 8010 are connected via a harness for example.

Vehicle speed sensor 8002 detects the vehicle speed from the revolution speed of driveshaft 6000, and transmits a signal representing the result of detection to ECU 8000. The position of shift lever 8004 is detected by position switch 8005, and a signal representing the result of detection is transmitted to ECU 8000. A gear of transmission 2000 is automatically implemented according to the position of shift lever 8004. Alternatively, the configuration may be such that the driver can select a manual shift mode in which the driver is allowed to select any gear through an operation by himself/herself.

Accelerator position sensor 8007 detects the position of accelerator pedal 8006, and transmits a signal representing the result of detection to ECU 8000. Stop lamp switch 8009 detects an ON/OFF state of brake pedal 8008, and transmits a signal representing the result of detection to ECU 8000. A stroke sensor detecting the extent of stroke of brake pedal 8008 may be provided instead of stop lamp switch 8009. Oil temperature sensor 8010 detects a temperature of an ATF (Automatic Transmission Fluid) of transmission 2000, and transmits a signal representing the result of detection to ECU 8000.

ECU 8000 controls vehicle's devices such that the vehicle attains a desired running state based on signals transmitted from vehicle speed sensor 8002, position switch 8005 and accelerator position sensor 8007, stop lamp switch 8009, oil temperature sensor 8010, and the like, as well as a map and a program stored in a ROM (Read Only Memory).

Referring to FIG. 2, planetary gear unit 3000 will be described. Planetary gear unit 3000 is connected to torque converter 3200 having an input shaft 3100 coupled to the crankshaft. Planetary gear unit 3000 includes a first set of the planetary gear mechanism 3300, a second set of the planetary gear mechanism 3400, an output gear 3500, B1, B2 and B3 brakes 3610, 3620 and 3630 fixed to a gear case 3600, C1 and C2 clutches 3640 and 3650, and a one-way clutch F 3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (ULD) 3340. Pinion gear 3320 engages with sun gear S (UD) 3310 and ring gear R (UD) 3330.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear (S) 3440, and a ring gear R (1) (R (2)) 3450.

Sun gear S (D) 3410 is coupled to carrier C (LTD) 3340. Short pinion gear 3420 is rotatably supported on carrier C (1) 3422. Short pinion gear 3420 engages with sun gear S (D) 3410 and long pinion gear 3430. Carrier C (1) 3422 is coupled to output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is coupled to output gear 3500.

Sun gear (S) 3440 is coupled to output shaft 3210 of torque converter 3200 by C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one-way clutch F 3660, and is disabled in rotation during the drive at the first gear.

FIG. 3 is an operation table showing the relation between gears to be shifted and operation states of the clutches and brakes. The circular mark represents engagement. The X mark represents disengagement. The double circular mark represents engagement only during engine braking. The triangular mark represents engagement only during driving. By operating each brake and each clutch based on the combination shown in the operation table, the forward gears including first to sixth and the reverse gear are implemented.

As one-way clutch F 3660 is provided in parallel to B2 brake 3620, in implementing the first gear (1ST), it is not necessary to engage B2 brake 3620 in the state driven from the engine side (in acceleration), as shown with the double circular mark in the operation table. In the present embodiment, one-way clutch F 3660 prevents rotation of ring gear R (1) (R (2)) 3450, during the drive at the first gear. When engine brake is applied, one-way clutch F 3660 does not prevent rotation of ring gear R (1) (R (2)) 3450.

ECU 8000 receives input of engine 1000 speed NE and turbine speed NT representing the output shaft revolution speed of torque converter 3200. ECU 8000 calculates a slip revolution speed N(SLP) of torque converter 3200 as (engine speed NE—turbine speed NT).

ECU 8000 controls oil hydraulic circuit 4000 based on a predetermined shift map (a map determined based on a vehicle speed and an electronic throttle position), so as to attain an engagement state shown in FIG. 3. Under such gear shift control, coastdown (down-shifting carried out as a result that the vehicle speed lowers in a coasting state where the driver does not press the accelerator pedal and crosses a down-shift line) gear shift may be carried out. If the shift line is crossed, even in the coastdown gear shift, gear shift control is started uniformly without distinction from other types of gear shift, to thereby modify an engagement/disengagement state of the frictional engagement element. In such uniform gear shift control, however, a state (driving state and driven state) of the vehicle is different depending on a state of control with flexibility, of a lockup clutch of a torque converter with lockup clutch, a gradient of a road surface, a state of a braking operation, a fast idle control state (control for making an idling speed for promoting warm-up of the engine immediately after the start greater than a normal idling speed), and the like. Such uniform gear shift control despite the difference in the state of the vehicle, however, leads to variation in gear shift shock.

Therefore, the present embodiment achieves excellent gear shift characteristics by executing a program in ECU 8000 as shown in the flowchart below so as to vary an engagement pressure in oil hydraulic circuit 4000 based on a slip revolution speed of the torque converter.

Figure 4:
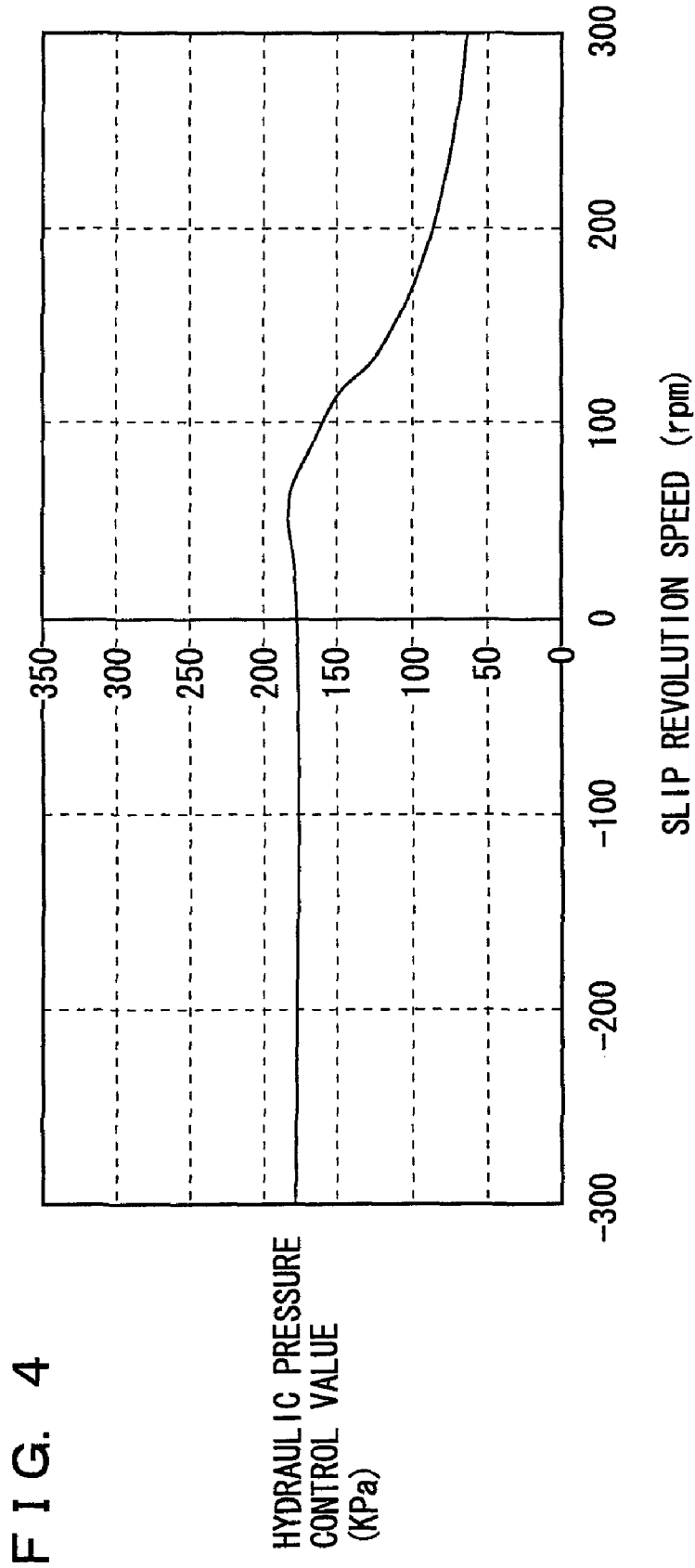
FIG. 4 shows a map stored in a memory within an ECU serving as the control device according to the first embodiment of the present invention.

FIG. 4 shows a map stored in a memory of ECU 8000 serving as the control device according to the present embodiment.

As shown in FIG. 4, in the map, the abscissa represents slip revolution speed N(SLP) (=engine speed NE−turbine speed NT) and the ordinate represents a hydraulic pressure control value of the frictional engagement element such as a clutch or a brake.

As shown in FIG. 4, in a region where the slip revolution speed is negative, the hydraulic pressure control value is substantially constant, however, in a region where the slip revolution speed is positive, the hydraulic pressure control value tends to decrease substantially uniformly. As slip revolution speed N(SLP) is expressed as engine speed NE−turbine speed NT, if the driver applies the brake relatively suddenly in coastdown, slip revolution speed N(SLP) of the torque converter attains to a positive value, because engine speed NE is greater than turbine speed NT. In such a case, gear shift shock is suppressed by suppressing the hydraulic pressure control value to a level lower than when the brake is gradually pressed (when slip revolution speed N(SLP) is negative).

Figure 5:
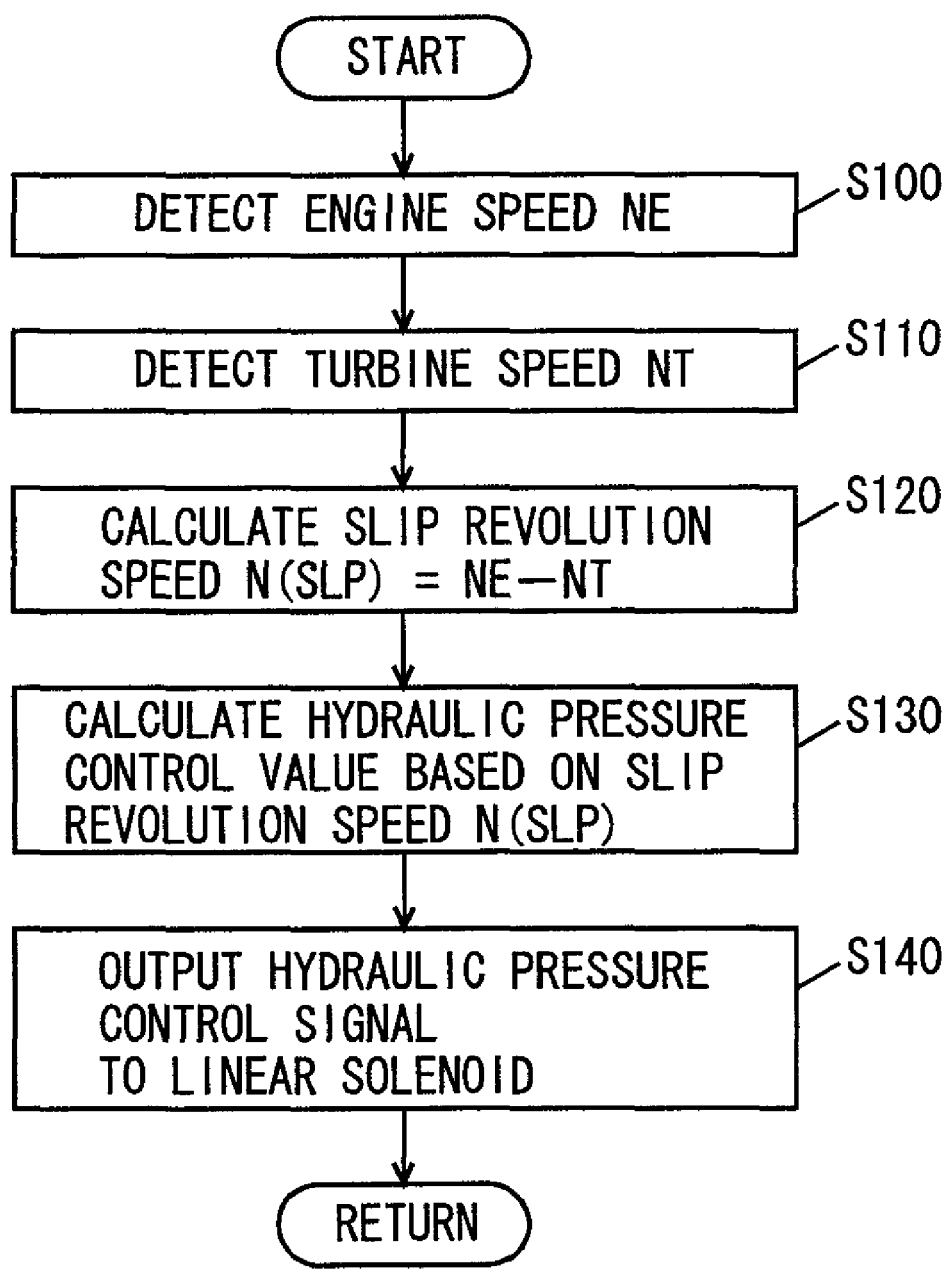
FIG. 5 is a flowchart showing a control configuration of a program executed by the ECU serving as the control device according to the first embodiment of the present invention.

A control configuration of a program executed in ECU 8000 serving as the control device according to the present embodiment will be described with reference to FIG. 5.

In step (hereinafter, step is abbreviated as S) 100, ECU 8000 detects engine speed NE. In S110, ECU 8000 detects turbine speed NT representing the output shaft revolution speed of the torque converter and the input shaft revolution speed to the automatic transmission.

In S120, ECU 8000 calculates slip revolution speed N(SLP) of the torque converter as (engine speed NE−turbine speed NT).

In S130, ECU 8000 calculates the hydraulic pressure control value based on slip revolution speed N(SLP). Here, the hydraulic pressure control value is calculated from the slip revolution speed of the torque converter, based on the map shown in FIG. 4.

In S140, ECU 8000 outputs a hydraulic pressure control signal to a linear solenoid of oil hydraulic circuit 4000. Here, such a control duty value as producing the hydraulic pressure control value calculated in S130 is output to the linear solenoid.

An operation of the automatic transmission controlled by ECU 8000 serving as the control device according to the present embodiment, based on the configuration and the flowchart as above, will be described.

When the down-shift line is passed while the vehicle is in the coasting state, it is determined that down-shift is to be carried out. ECU 8000 adjusts the hydraulic pressure control value at this time to an optimal value. Engine speed NE is detected (S100), turbine speed NT is detected (S110), and slip revolution speed N(SLP) of the torque converter is calculated as (engine speed NE−turbine speed NT) (S120).

Here, if the driver is performing a relatively strong braking operation, engine speed NE becomes greater than turbine speed NT and slip revolution speed N(SLP) attains to a positive value. Accordingly, as shown in the map in FIG. 4, the hydraulic pressure control value is calculated to be lower than when slip revolution speed N(SLP) attains to a negative value (S130). In order to attain this hydraulic pressure control value, the hydraulic pressure control signal (duty signal) is output to the linear solenoid (S140).

Thus, shock during coastdown that particularly noticeably occurs when a relatively strong braking operation is performed can be suppressed by lowering the hydraulic pressure control value.

Second Embodiment

A second embodiment of the present invention will be described hereinafter. In the present embodiment, a waiting time from determination of the frictional engagement element on the disengagement side until determination of engagement of the frictional engagement element on the engagement side in clutch-to-clutch (down-shifting from fourth to third shown in FIG. 3) is optimized, based on slip revolution speed N(SLP) of the torque converter. It is noted that FIGS. 1 to 3 described in the first embodiment are the same also in the present embodiment. Therefore, detailed description thereof will not be repeated here.

The map stored in the memory within ECU 8000 serving as the control device according to the present embodiment will be described in connection with FIG. 6.

Figure 6:
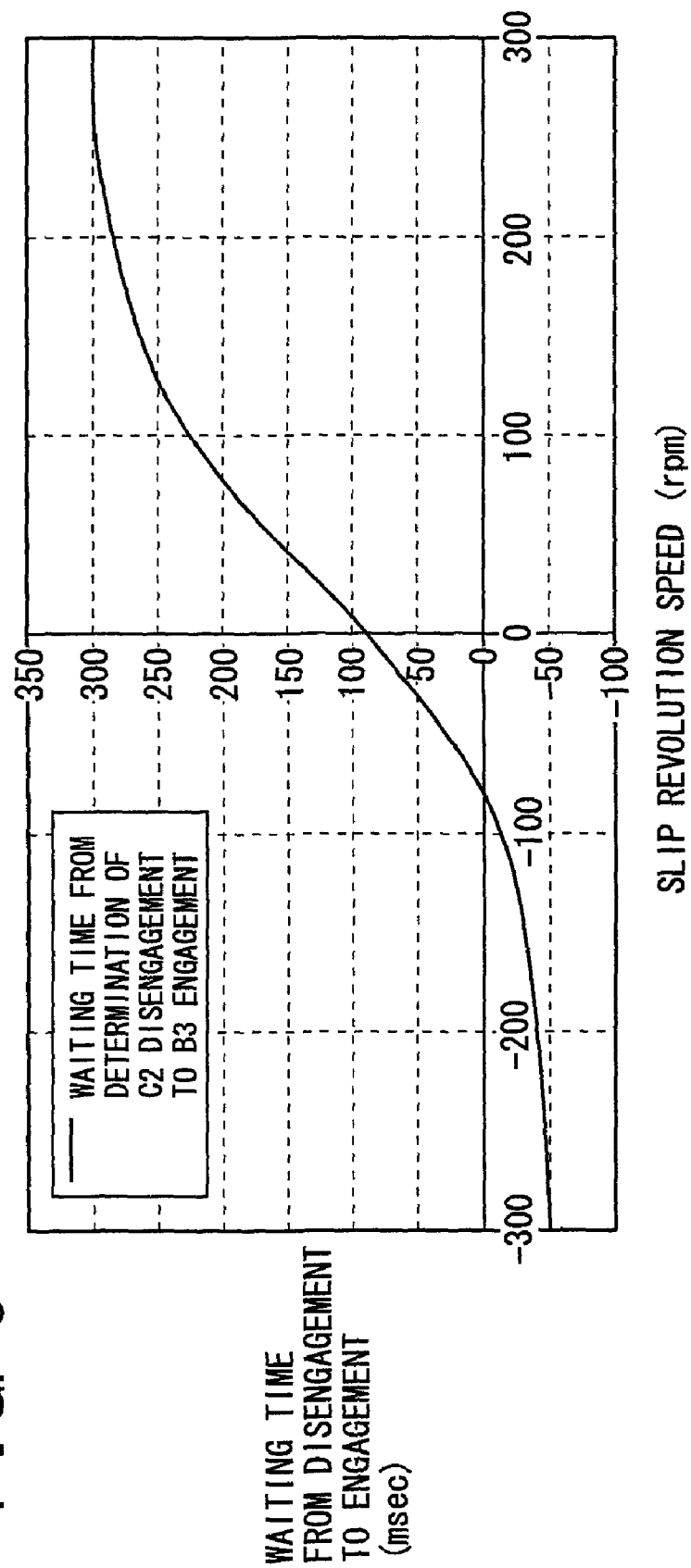
FIG. 6 shows a map stored in a memory within an ECU serving as a control device according to a second embodiment of the present invention.

In FIG. 6 as well, the abscissa represents slip revolution speed N(SLP) of the torque converter as in FIG. 4 above. The ordinate in FIG. 6 represents a waiting time from disengagement to engagement.

As shown in FIG. 6, as slip revolution speed N(SLP) of the torque converter is greater in positive direction, the waiting time is longer, and as slip revolution speed N(SLP) is greater in negative direction, the waiting time is shorter. When a gradual braking operation is performed, slip revolution speed N(SLP) of the torque converter attains to a negative value (namely, engine speed NE<turbine speed NT). Assuming coastdown gear shift from fourth to third, however, clutch-to-clutch gear shift in which clutch C2 is disengaged and brake B3 is engaged is carried out.

Here, gear shift shock is avoided by eliminating torque loss, for example by decreasing the waiting time from determination of disengagement of clutch C2 to determination of engagement of brake B3 (as the waiting time is a negative value, engagement of C2 and engagement of B3 may overlap to some extent) to create an overlapping state where both of the frictional engagement element on the disengagement side and the frictional engagement element on the engagement side are engaged.

On the other hand, when a relatively sudden braking operation is performed, slip revolution speed N(SLP) of the torque converter attains to a positive value (namely, engine speed NE>turbine speed NT). In such a case, the waiting time from determination of disengagement of clutch C2 serving as the frictional engagement element on the disengagement side to engagement of brake B3 serving as the frictional engagement element on the engagement side is set longer, so that engagement of brake B3 serving as the frictional engagement element on the engagement side is started only after engine speed NE has already lowered to a value in the vicinity of the synchronous revolution speed of the third. As engine speed NE has thus already lowered to a value in the vicinity of the synchronous revolution speed of the third, gear shift shock can be suppressed.

Figure 7:
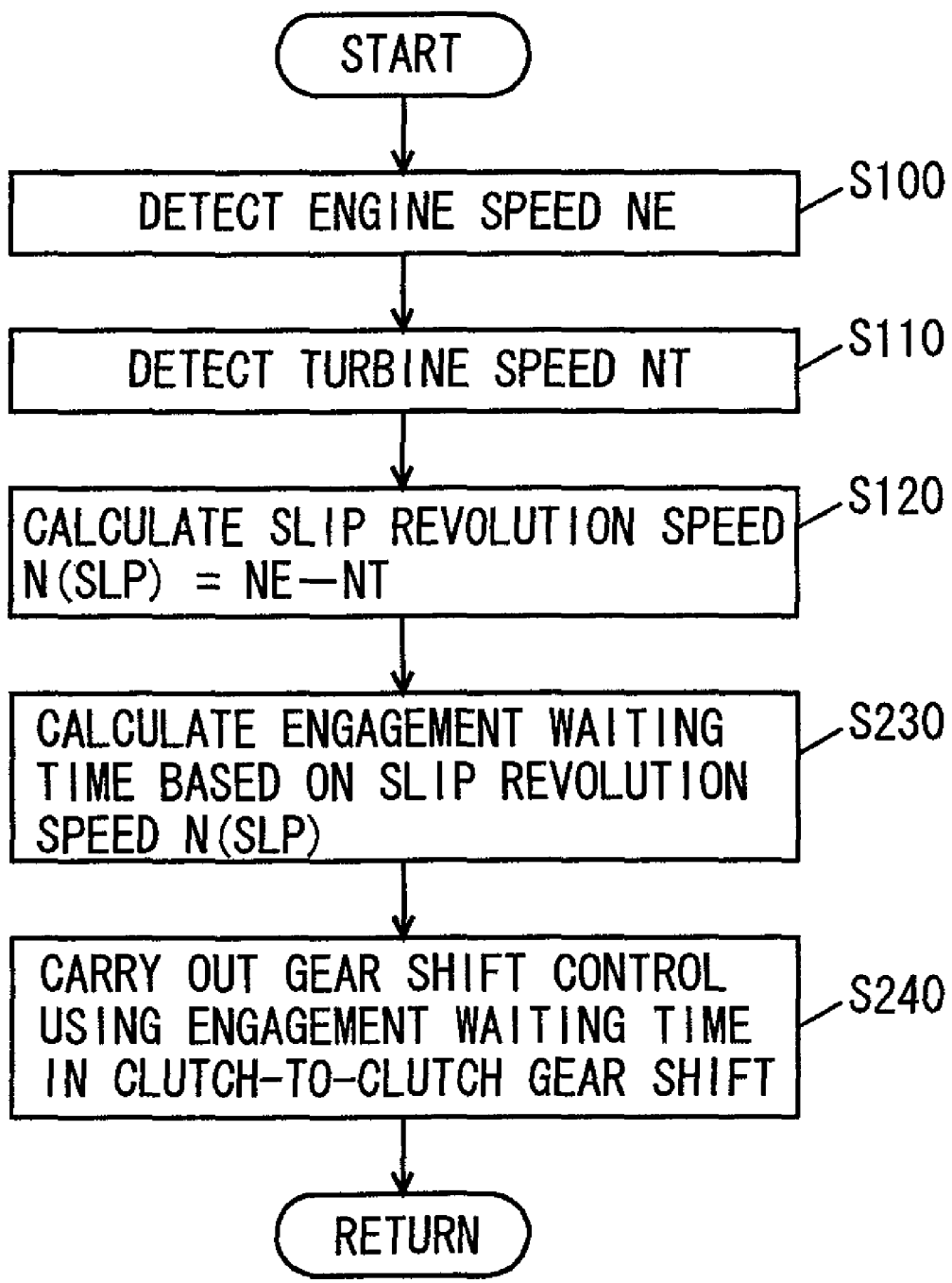
FIG. 7 is a flowchart showing a control configuration of a program executed by the ECU serving as the control device according to the second embodiment of the present invention.

A control configuration of a program executed in ECU 8000 serving as the control device according to the present embodiment will be described with reference to FIG. 7. It is noted that the same step number is allotted to processing in the flowchart shown in FIG. 7 the same as that in the flowchart shown in FIG. 5 above, and the processing is also the same. Therefore, detailed description thereof will not be repeated here.

In S230, ECU 8000 calculates an engagement waiting time based on slip revolution speed N(SLP) of the torque converter. Here, the engagement waiting time is calculated by using a map shown in FIG. 6. In S240, ECU 8000 carries out gear shift control by using the engagement waiting time in clutch-to-clutch gear shift.

As described above, in coastdown gear shift and in clutch-to-clutch gear shift, when the braking operation by the driver is sudden and the slip revolution speed of the torque converter attains to a positive value, gear shift shock can be suppressed by securing a longer waiting time from determination of disengagement of the frictional engagement element on the disengagement side until determination of engagement of the frictional engagement element on the engagement side so that engagement of the frictional engagement element on the engagement side is started only after engine speed NE has lowered to the synchronous revolution speed after gear shift. Meanwhile, when the gradual braking operation is performed, the slip revolution speed of the torque converter attains to a negative value, and in such a case, the waiting time from determination of disengagement of the frictional engagement element on the disengagement side until determination of engagement of the frictional engagement element on the engagement side is shortened or overlapped. By doing so, torque loss due to absence of engagement of both frictional engagement elements can be avoided and gear shift shock can be suppressed.

Third Embodiment

A third embodiment of the present invention will be described hereinafter. In the present embodiment, the coastdown shift line is modified in accordance with slip revolution speed N(SLP) of the torque converter. More specifically, the output shaft revolution speed of the automatic transmission defining the coastdown shift line is varied. It is noted that FIGS. 1 to 3 described in the first embodiment are the same also in the present embodiment, as in the second embodiment described previously. Therefore, detailed description thereof will not be repeated here.

The map stored in the memory within ECU 8000 serving as the control device according to the present embodiment will be described with reference to FIG. 8.

As shown in FIG. 8, the map defines the output shaft revolution speed NOUT of the automatic transmission as to which coastdown gear shift is determined, for each range of slip revolution speed N(SLP) of the torque converter.

As shown in FIG. 8, as slip revolution speed N(SLP) of the torque converter is smaller in negative values, output shaft revolution speed NOUT of the coastdown shift line (vehicle speed NOUT at the time of gear shift) is higher. On the other hand, as slip revolution speed N(SLP) of the torque converter is greater in positive values, output shaft revolution speed NOUT of the coastdown shift line (vehicle speed NOUT at the time of gear shift) is smaller.

For example, when slip revolution speed N(SLP) of the torque converter is smaller than −100, vehicle speed NOUT at the time of gear shift in coastdown is set to 1700 rpm. When slip revolution speed N(SLP) of the torque converter is greater than 150, vehicle speed NOUT at the time of gear shift in coastdown is set to 1400 rpm.

Figure 9:
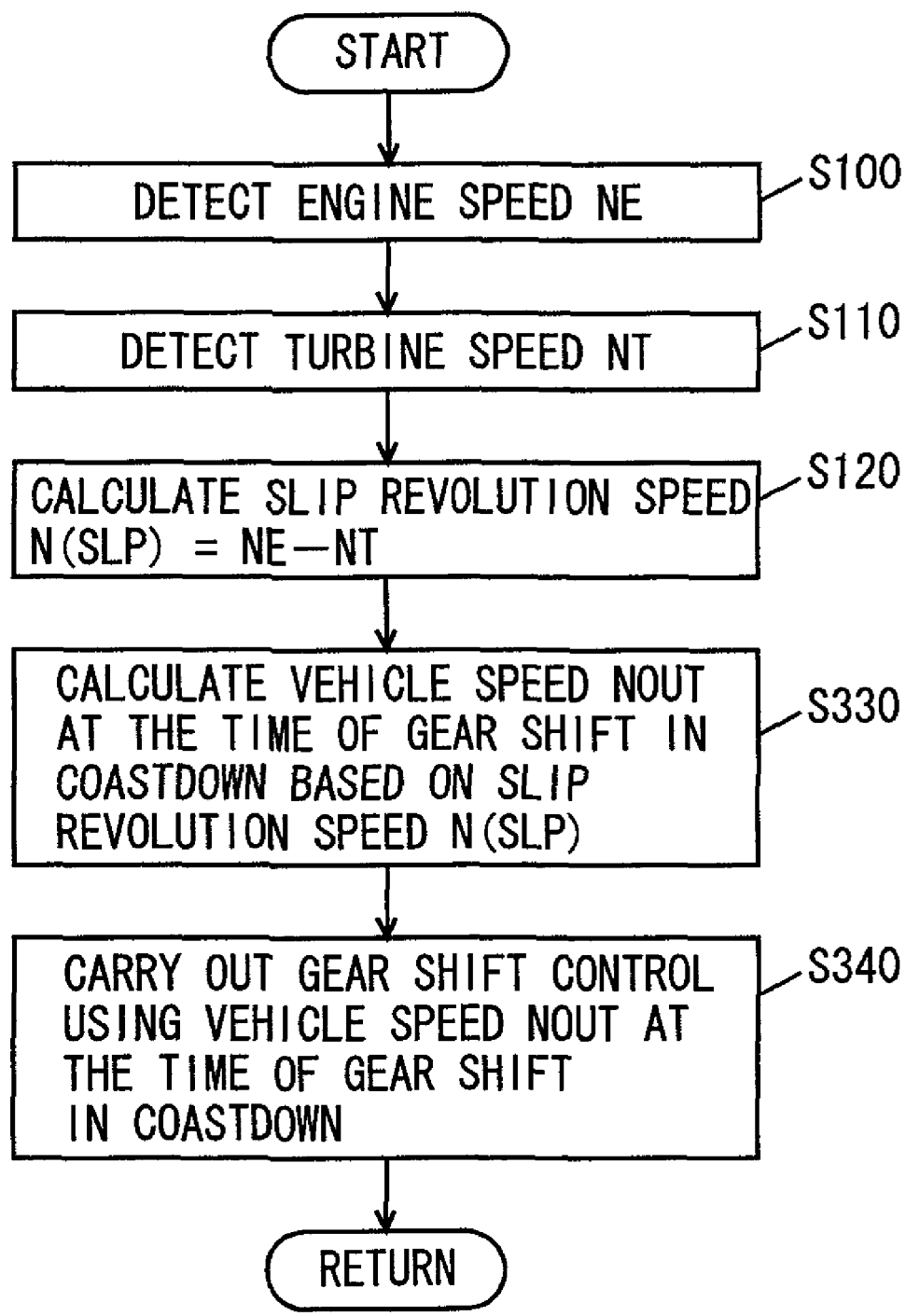
FIG. 9 is a flowchart showing a control configuration of a program executed by the ECU serving as the control device according to the third embodiment of the present invention.

A control configuration of a program executed in ECU 8000 serving as the control device according to the present embodiment will be described with reference to FIG. 9. It is noted that the same step number is allotted to processing in the flowchart shown in FIG. 9 the same as that in the flowchart shown in FIG. 5 above, and the processing is also the same. Therefore, detailed description thereof will not be repeated here.

In S330, ECU 8000 calculates vehicle speed NOUT at the time of gear shift in coastdown based on slip revolution speed N(SLP) of the torque converter. Here, vehicle speed NOUT at the time of gear shift in coastdown is calculated from slip revolution speed N(SLP) of the torque converter based on the map shown in FIG. 8. In S340, ECU 8000 carries out gear shift control using vehicle speed NOUT at the time of gear shift in coastdown.

As described above, according to the ECU serving as the control device of the present embodiment, setting is such that, as the slip revolution speed of the torque converter is smaller, the vehicle speed at the time of gear shift in coastdown is higher, while as the slip revolution speed of the torque converter is greater, the vehicle speed at the time of gear shift in coastdown is lower. Then, for example, the sudden braking operation by the driver brings about engine speed NE greater than turbine speed NT and hence greater slip revolution speed N(SLP). In such a case, timing to start engagement of the frictional engagement element on the engagement side in clutch-to-clutch gear shift can be delayed. By thus delaying the timing, the engine speed can be lowered to a level in the vicinity of the synchronous revolution speed after gear shift and gear shift shock can be suppressed.

Each embodiment described above may also be applicable to an example where torque converter 3200 contains a lockup clutch and the lockup clutch is under control with flexibility.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A control device of an automatic transmission in which motive power of a power source is transmitted via a fluid coupling and a plurality of gears are implemented based on combination of engagement and disengagement of a plurality of frictional engagement elements, comprising:
   a detection unit detecting a difference in a revolution speed calculated by subtracting an input shaft revolution speed of said automatic transmission from a revolution speed of said power source; and
   a control unit modifying a manner of control of said frictional engagement element in correspondence with the difference in the revolution speed detected by said detection unit; wherein
   said control unit lowers a hydraulic pressure control value of said frictional engagement element as said difference in the revolution speed is greater.

2. A control device of an automatic transmission in which motive power of a power source is transmitted via a fluid coupling and a plurality of gears are implemented based on combination of engagement and disengagement of a plurality of frictional engagement elements, comprising:
   a detection unit detecting a difference in a revolution speed calculated by subtracting an input shaft revolution speed of said automatic transmission from a revolution speed of said power source; and
   a control unit modifying a manner of control of said frictional engagement element in correspondence with the difference in the revolution speed detected by said detection unit; wherein
   said control unit modifies engagement start timing of said frictional engagement element.

3. A control device of an automatic transmission in which motive power of a power source is transmitted via a fluid coupling and a plurality of gears are implemented based on combination of engagement and disengagement of a plurality of frictional engagement elements, comprising:
   a detection unit detecting a difference in a revolution speed calculated by subtracting an input shaft revolution speed of said automatic transmission from a revolution speed of said power source; and
   a control unit modifying a manner of control of said frictional engagement element in correspondence with the difference in the revolution speed detected by said detection unit; wherein
   said control unit lowers a vehicle speed during gear shift as said difference in the revolution speed is greater.

4. The control device of an automatic transmission according to claim 1, wherein
   when the difference in the revolution speed is negative, said control unit maintains the hydraulic pressure control value of said frictional engagement element substantially constant.

5. A control device of an automatic transmission according to claim 2, wherein
as the difference in the revolution speed is greater, said control unit delays the engagement start timing of said frictional engagement element.

6. A control device of an automatic transmission in which motive power of a power source is transmitted via a fluid coupling and a plurality of gears are implemented based on combination of engagement and disengagement of a plurality of frictional engagement elements, comprising:
detection means for detecting a difference in a revolution speed calculated by subtracting an input shaft revolution speed of said automatic transmission from a revolution speed of said power source; and
control means for modifying a manner of control of said frictional engagement element in correspondence with the difference in the revolution speed detected by said detection means; wherein
said control means includes means for lowering a hydraulic pressure control value of said frictional engagement element as said difference in the revolution speed is greater.

7. A control device of an automatic transmission in which motive power of a power source is transmitted via a fluid coupling and a plurality of gears are implemented based on combination of engagement and disengagement of a plurality of frictional engagement elements, comprising:
detection means for detecting a difference in a revolution speed calculated by subtracting an input shaft revolution speed of said automatic transmission from a revolution speed of said power source; and
control means for modifying a manner of control of said frictional engagement element in correspondence with the difference in the revolution speed detected by said detection means; wherein
said control means modifies engagement start timing of said frictional engagement element.

8. A control device of an automatic transmission in which motive power of a power source is transmitted via a fluid coupling and a plurality of gears are implemented based on combination of engagement and disengagement of a plurality of frictional engagement elements, comprising:
detection means for detecting a difference in a revolution speed calculated by subtracting an input shaft revolution speed of said automatic transmission from a revolution speed of said power source; and
control means for modifying a manner of control of said frictional engagement element in correspondence with the difference in the revolution speed detected by said detection means; wherein
said control means includes means for lowering a vehicle speed during gear shift as said difference in the revolution speed is greater.

9. The control device of an automatic transmission according to claim 6, wherein
said control means includes means for maintaining the hydraulic pressure control value of said frictional engagement element substantially constant when the difference in the revolution speed is negative.

10. The control device of an automatic transmission according to claim 7, wherein
said control means includes means for delaying the engagement start timing of said frictional engagement element as the difference in the revolution speed is greater.

* * * * *